US005582842A

United States Patent [19]
Wise et al.

[11] Patent Number: 5,582,842
[45] Date of Patent: *Dec. 10, 1996

[54] MANIFOLD CALIBRATION FINGER

[75] Inventors: John Wise; Larry L. Martin, both of Hamilton, Ohio

[73] Assignee: Advanced Drainage Systems, Inc., Columbus, Ohio

[*] Notice: The term of this patent shall not extend beyond the expiration date of Pat. No. 5,460,501.

[21] Appl. No.: 224,540

[22] Filed: Apr. 7, 1994

[51] Int. Cl.$^6$ ................................................. B29C 47/90
[52] U.S. Cl. .......................... 425/71; 425/190; 425/325; 425/380; 425/388; 425/393; 264/209.4
[58] Field of Search .................................. 425/67, 68, 70, 425/71, 384, 388, 393, 392, 85, 190, 404, 325, 326.1, 380; 264/209.4

[56] References Cited

U.S. PATENT DOCUMENTS

| | | | |
|---|---|---|---|
| 3,212,135 | 10/1965 | Branscum | 264/209.4 |
| 3,320,637 | 5/1967 | Dijk | 264/209.4 |
| 3,963,403 | 6/1976 | Hughes et al. | 425/325 |
| 4,510,013 | 4/1985 | Lupke et al. | 425/393 |
| 4,663,107 | 5/1987 | Takada et al. | 425/71 |
| 4,710,337 | 12/1987 | Nordstrom | 264/209.4 |
| 4,770,618 | 9/1988 | Lupke | 425/393 |
| 5,132,062 | 7/1992 | Brambilla | 264/209.4 |
| 5,186,878 | 2/1993 | Lupke | 264/209.4 |
| 5,296,188 | 3/1994 | Lupke | 264/209.4 |

FOREIGN PATENT DOCUMENTS

2685886  7/1993  France ............................ 264/209.4

Primary Examiner—Khanh P. Nguyen
Attorney, Agent, or Firm—Biebel & French

[57] ABSTRACT

An improved manifold calibration finger which can be used in conjunction with a die head in the extrusion of a plastic with the manifold calibration finger comprising a first section comprising an elongate tubular member having a grooved outer surface and an elongate central channel extending through the first section from one end of the first section to the other.

15 Claims, 6 Drawing Sheets

MANIFOLD CALIBRATION FINGER

BACKGROUND OF THE INVENTION

This invention relates generally to a manifold calibration finger for use with a die head in the extrusion of a plastic, and more particularly to an improved structure capable of forming a pipe wall with apertures therein when the pipe is examined in cross-section.

Plastic pipe has found a variety of uses especially relating to drainage. One of the concerns in the manufacture of plastic pipe is the amount of raw materials consumed and the resultant weight of the finished product. For example, 48" interior diameter solid wall plastic pipe weighs approximately 200 lbs per foot. It has recently been discovered that plastic pipe having apertures formed therein, when the pipe is viewed in cross-section, weighs approximately 30 lbs per linear foot. However, a problem exists in designing a machine capable of manufacturing pipe having the desired cross-section.

In general, extruded plastic pipe is formed on a production line having a variety of specific machines incorporated into the manufacturing process. One of the first machines is an extruder. Plastic powder, or more preferably pellets, is fed through the extruder where it is subjected to high temperatures such that the plastic melts. The plasticized plastic then proceeds through a feed tube, at the end of which the plastic enters into a typically drum shaped die. At the front of the die is the specific cross-section profile to be extruded. As the hot plastic comes out of the die, it passes over what are called calibrating or calibration fingers which assist in maintaining the desired cross-sectional form which has been extruded. In addition to the extruder and die, which is supported on a die post assembly, plastic pipe is manufactured using a former or forming head.

Prior art manifold calibration fingers have apparently limited the ability to manufacture a plastic product having the cross-section which incorporates apertures. It is thus apparent that the need exists for an improved manifold calibration finger which manufactures a product having the desired cross-section.

SUMMARY OF THE INVENTION

The problems associated with prior manifold calibration fingers are overcome in accordance with the present invention by the presence of an improved manifold calibration finger which can be used in conjunction with a die head in the extrusion of a plastic with the manifold calibration finger comprising a first section comprising an elongate tubular member having a grooved outer surface and an elongate central channel extending through the first section from one end of the first section to the other.

The manifold calibration finger also comprises a second section comprising a tubular member with an outer surface and an inner surface with a plurality of apertures extending between the outer and inner surfaces. Additionally a plurality of elongate channels extend through less than the full length of the first section. The first section also has a plurality of channels extending from the central channel to the grooved outer surface.

There is also disclosed an improved manifold calibration finger for use with a die head in the extrusion of a plastic, with the manifold calibration finger comprising a first tubular member and a second tubular member. The first tubular member comprises a tubular outer shell and an intermediate tube. The tubular outer shell has a first and second end, and an outer surface with a first radial groove formed therein. The first radial groove has a plurality of apertures also formed therein. The intermediate tube has a first and second end, and an inner and outer surface. The intermediate tube has formed therethrough generally longitudinally extending channels for the passage of water therethrough in a first direction.

The first tubular member also has a plurality of radially extending channels extending from the apertures to the inner surface for the passage of air therethrough. The tubular outer shell encircles the intermediate tube. The second tubular member comprises a curved member having a first end and a second end and inner and outer surfaces. A plurality of apertures extend from the curved member outer surface to the curved member inner surface. The second tubular member is connected to the first tubular member.

Additionally, the first tubular member second end is attached to the curved member first end. Also, the first tubular member is of a first length and the second tubular member is of a second length, with the second length being longer than the first length. The outer shell outer surface is formed having two flat sections and two curved sections. A portion of the intermediate tube outer surface is directly adjacent the outer shell inner surface. The outer shell is comprised of a first finger end and a finger shell secured to one another by a threaded connecting ring. The outer shell is also comprised of a second finger end.

The outer shell outer surface has a second radial groove formed therein. The second radial groove also has a plurality of apertures formed therein. The first tubular member thus also has a plurality of channels extending from the second radial groove apertures to the inner surface. The intermediate tube of the first tubular member is attached to the curved member first end. The curved member apertures have a diameter greater than that of the first tubular member apertures. The outer shell outer surface has a spiral groove formed therein with the spiral groove intersecting with the first radial groove. Furthermore, the spiral groove in the preferred embodiment of the invention intersects both the first and second radial grooves.

There is also disclosed in combination, a plurality of improved manifold calibration fingers for use with a die head in the extrusion of a plastic, each of the manifold calibration fingers comprising a first tubular member and a second tubular member. The first tubular member comprises a tubular outer shell and an intermediate tube. The tubular outer shell has a first and second end and an outer surface with a first radial groove formed therein. The first radial groove has a plurality of apertures also formed therein. The intermediate tube has a first and second end and an inner and outer surface. The intermediate tube has formed therethrough generally longitudinally extending channels for the passage of water therethrough in a first direction.

The first tubular member also has a plurality of radially extending channels extending from the apertures to the inner surface for the passage of air therethrough. The tubular outer shell encircles the intermediate tube. The second tubular member comprises a curved member having a first end and a second end and inner and outer surfaces. A plurality of apertures extend from the curved member outer surface to the curved member inner surface. The second tubular member is connected to the first tubular member, each of the outer shell outer surfaces having two flat sections and two curved sections with each of the calibration fingers adjacent at least one other calibration finger such that a flat section on one calibration finger is parallel to a flat section on an adjacent calibration finger.

Furthermore, in this combination each of the outer shell outer surfaces has a spiral groove formed therein with this spiral groove intersecting the first radial groove. Still further, the outer shell outer surface preferably has a second radial groove formed therein with each of the second radial grooves having a plurality of apertures formed therein such that each of the first tubular members have a plurality of channels extending from a second radial groove to the respective said inner surface.

It is the primary object of the present invention to provide an improved manifold calibration finger which can manufacture pipe having a plurality of apertures formed therein when the pipe wall is viewed in cross-section.

Other objects and advantages of the invention will be apparent from the following description, the accompanying drawings, and the appended claims.

DETAILED DESCRIPTION OF THE INVENTION

Figure 1:
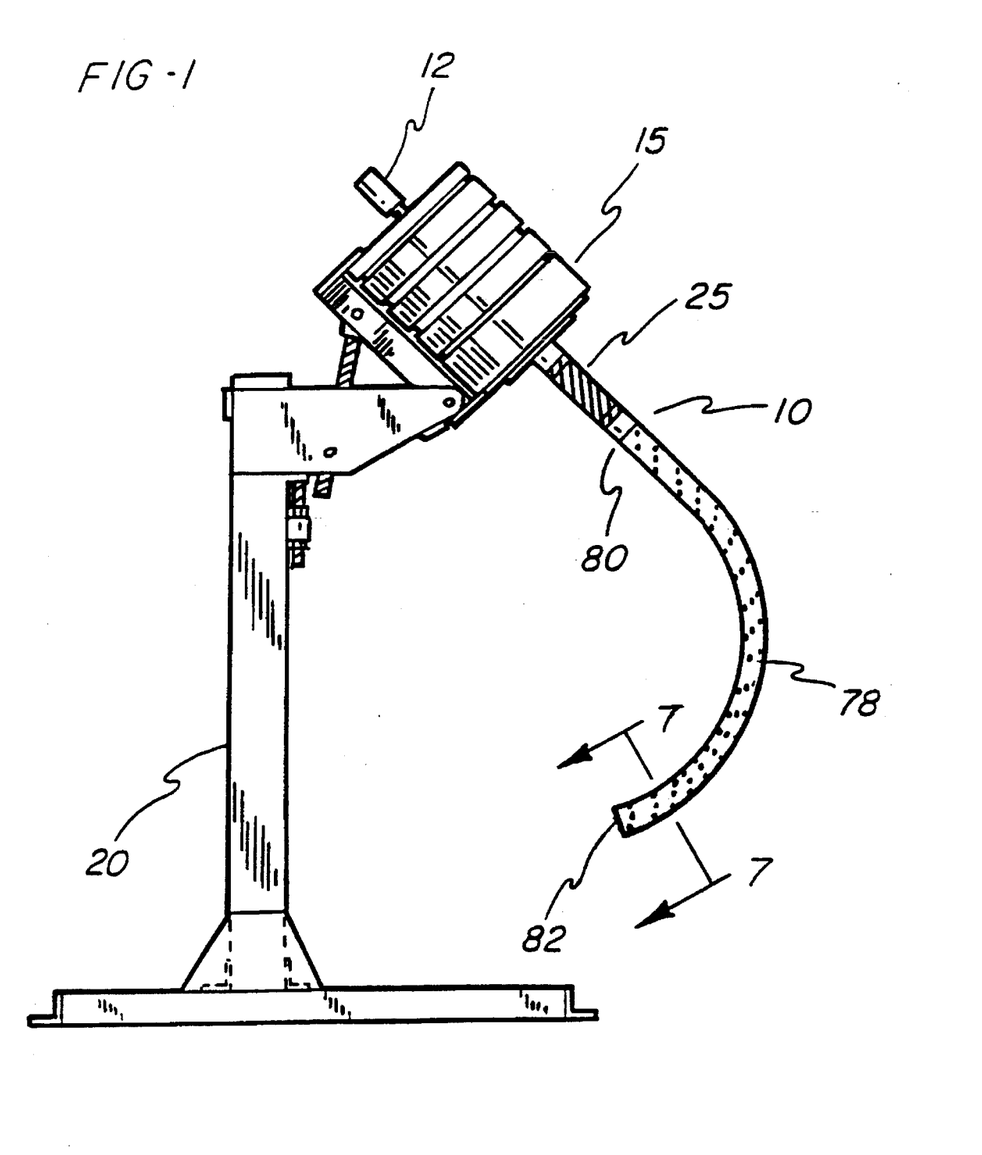
FIG. 1 is a side view of a die and die post assembly with a manifold calibration finger formed in accordance with the present invention secured thereto in an operative position.

Having reference to the drawings, attention is directed first to FIG. 1 which shows the improved manifold calibration fingers associated with this present invention generally disclosed by the numeral 10. The manifold calibration fingers are part of an improved manifold 12 contained within die 15. Drum shaped die 15 is supported on a die post assembly 20. The die and die post are of the type found in plastic extrusion manufacture. Similarly, the improved manifold calibration fingers 10 are located where calibration fingers of the prior art have been located namely, at the end of the die where the plastic is extruded therefrom.

Figure 2:
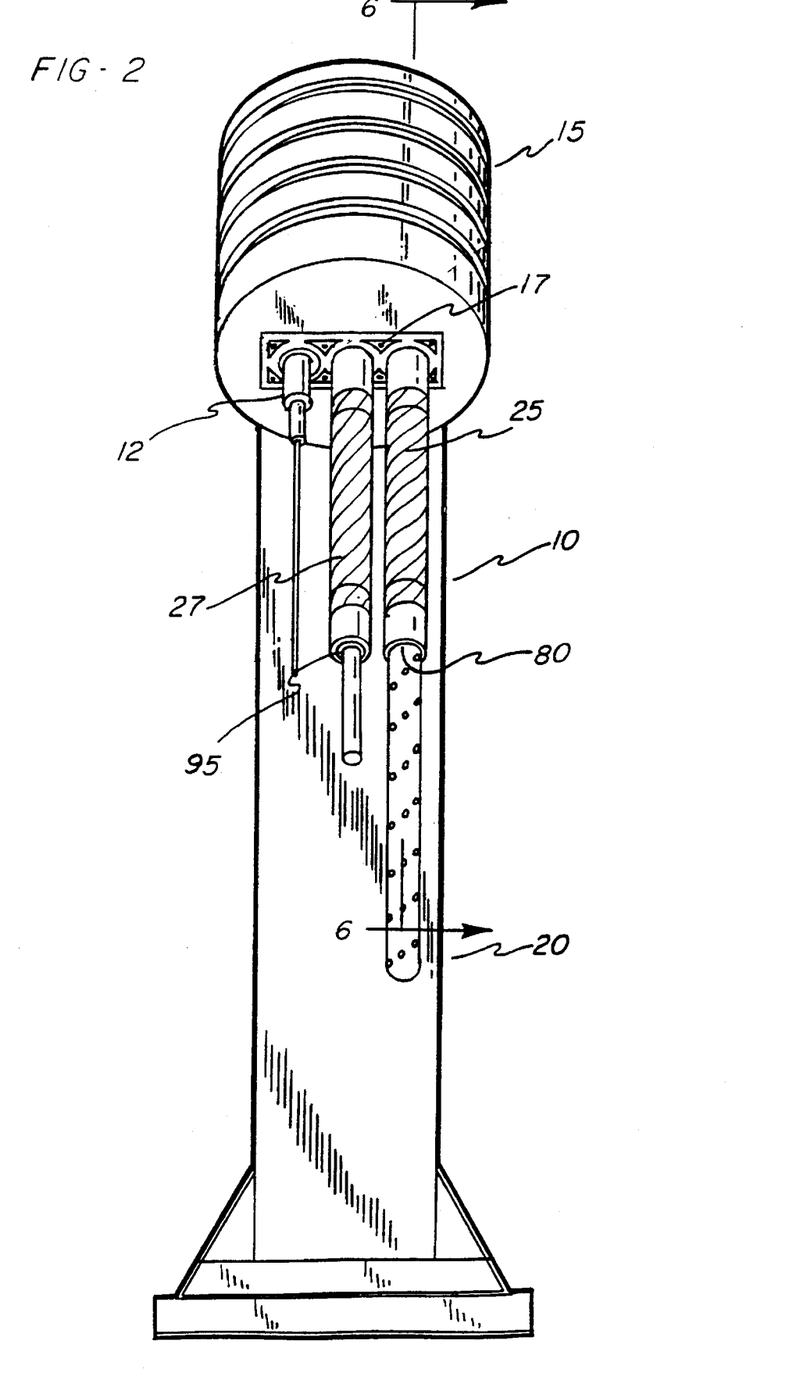
FIG. 2 is a front elevational view of a die and die post assembly in which the die will extrude the wall of a plastic pipe having apertures formed therein, specifically 8 small generally triangular shaped apertures as well as 3 larger generally circular shaped apertures.

This can better be appreciated from consideration of FIG. 2 which discloses the presence of a die head 17. Die heads are well known in the conventional extrusion art. However, this particular die head discloses the presence of 8 small triangular sections and 3 larger circular sections which will permit the extrusion of a pipe wall having a plurality of apertures formed therein. Extending through the die and die head 17 is a portion of the die manifold assembly 12 to which this invention is physically secured. This portion of the die manifold assembly 12 is shown at the left-most side of the die head 17 and extends some distance from the drum-shaped die.

At the right-most side of the die head 17 is the improved manifold calibration finger associated with the present invention shown in its complete assembly, as can be appreciated from comparison with FIG. 1. The improved manifold calibration finger of this invention is formed having a first tubular member and a second tubular member. The first tubular member is shown secured by itself to the die manifold assembly 12 at the center portion of the die head 17 in FIG. 2.

Figure 3:
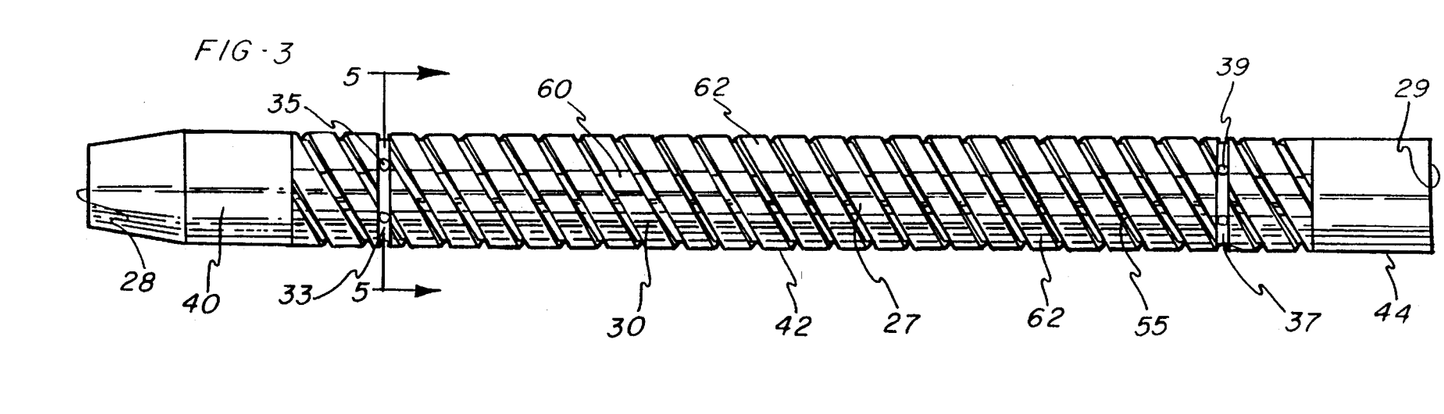
FIG. 3 is a side elevational view of the tubular outer shell of the first tubular member of the improved manifold calibration finger.

The first tubular member 25 is formed in the preferred embodiment of the invention a tubular outer shell 27. As be better appreciated from a comparison of FIGS. 2 with FIGS. 3, 5 and 6, the tubular outer shell 27 has a first end as well as a second end, 28 and 29 respectively. Additionally, the outer shell 27 is formed having an outer surface 30 with this outer surface 30 having formed therein a first radial groove 33. Formed in the first radial groove are a plurality of apertures 35. Additionally, in the preferred embodiment of the invention a second radial groove 37 is formed having a plurality of apertures 39 formed therein.

The tubular outer shell is preferably formed having a first finger end 40, a finger shell 42, and a second finger end 44. These three pieces are components of the tubular outer shell and are secured to each other by respective brass connecting rings 48. Each connecting ring 48 is merely a ring with a threaded outer surface which engages with a portion of the inner surface of the finger shell 42. A threaded portion of the inner surface of first finger,end 40 also engages with the connecting ring 48, with that first finger end inner surface being 52. A threaded portion of the inner surface of second finger end 44 also engages with the connecting ring 48, with that second finger end inner surface being 53.

In addition to first radial groove 33 and second radial groove 37 the outer surface 30 of tubular outer shell 27 also preferably has formed therein a spiral groove 55. It should also be appreciated that the spiral groove intersects with both the first radial groove and the second radial groove in the preferred embodiment of the invention. It will also be appreciated from a comparison of FIGS. 3 and 5 that the outer shell of the first section 25 of the centralmost set of tubes is preferably formed having two relatively flat surface portions 60 and two curved surface portions 62, whereas the outer two sets of tubes have a flat surface only with respect to their inner side wall as can be seen in Figs. 5A and 5B respectively.

Figure 4:
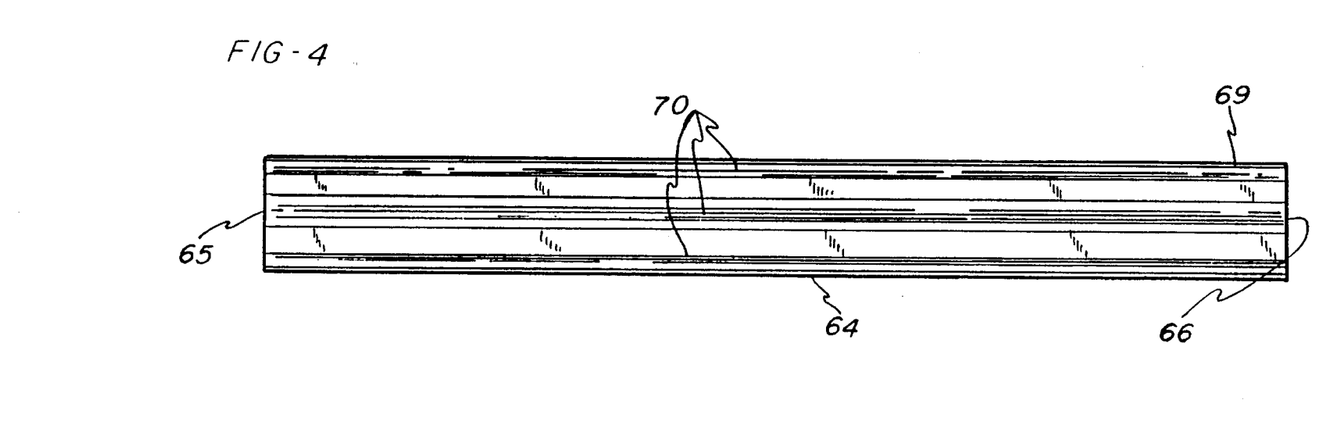
FIG. 4 is a side elevational view of the intermediate tube which in the preferred embodiment of the invention is formed and then inserted within the outer shell shown in FIG. 3.
Figure 5:
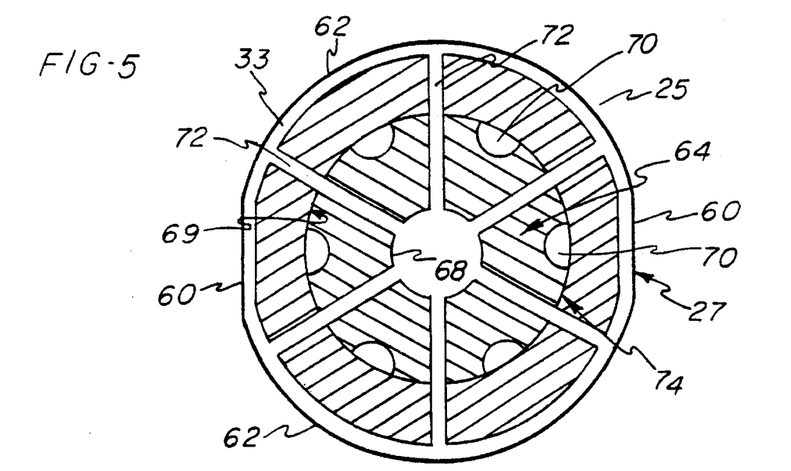
FIG. 5 is a vertical sectional view taken on a greatly enlarged scale along line 5—5 of FIG. 3, however, this particular view shows the first tubular member as assembled thereby disclosing both the tubular outer shell as well as the presence of the intermediate tube.
Figure 5A:
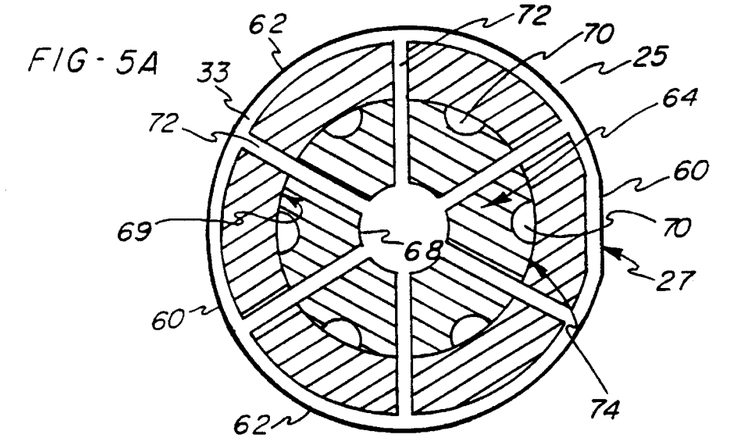
FIG. 5A is a vertical sectional view taken on a greatly enlarged scale and similar to FIG. 5, however, this particular view shows one of the endmost calibration finger first section as assembled.
Figure 5B:
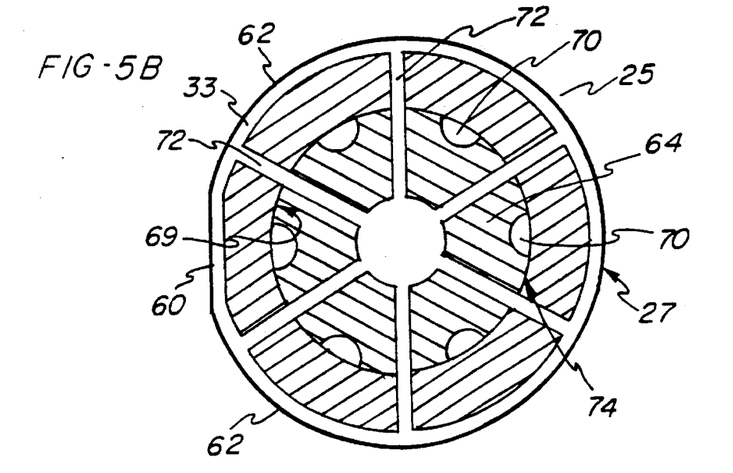
FIG. 5B is a vertical sectional view taken on a greatly enlarged scale and similar to FIGS. 5 and 5A, however, this particular view shows the other endmost calibration finger first section as assembled.

The intermediate tube 64 shown in FIG. 4 also has a first end 65 and a second end 66 as well as an inner surface 68 as can be appreciated from FIG. 5 as well as the outer surface 69 as can be appreciated from both Figs. 4 and 5. A plurality of generally longitudinally extending channels 70 are formed in the outer surface 69 of intermediate tube 64. In the preferred embodiment of the invention there are six such longitudinally extending channels.

As stated above, FIG. 5 shows a vertical cross-sectional view on a greatly enlarged scale wherein the intermediate tube is positioned so as to be encircled by the tubular outer shell 27. As such, the various longitudinally extending channels 70 may be seen to become enclosed such that they permit the passage of water in a first direction. Additionally, the presence of the cool water in the six channels helps to cool the tubular outer shell in the presence of the hot plastic. As can also be seen in FIG. 5, the first tubular member 25 also has a plurality of radially extending channels 72 which extend from the inner surface 68 of intermediate tube 64 to a radial groove either 33 or 37. In actual assembly of the first tubular member, the tubular outer shell has the intermediate tube placed therein then the appropriate holes are drilled through both the tubular outer shell and the intermediate tube. First, the tubular outer shell and intermediate tube are welded with the inner surface of the outer shell 27 being welded to the outer surface 69. Once the two components are stabilized and a 3/32" diameter hole is drilled, a 3/32" outer diameter aluminum tube with a 1/16" hole is press fit into the 3/32" hole until it reaches the inner surface 68. The tops of the tubes can be filed off and the radially extending channel 72 sealed in place with an appropriate sealant. Preferably the radial groove is placed on the outer shell after the aforementioned welding and drilling have occurred, but before the insertion of the tubes which make the radially extending channel 72.

The finger shell 42 is approximately 18" long in the preferred embodiment of the invention and has an outer diameter of approximately 2½". Preferably the center of the first radial groove is 2½" from the junction of the finger first end and finger shell. Meanwhile, the second radial groove is approximately 1 9/16" from the junction of the second finger end and finger shell. The spiral groove is 3/32" wide and has a 1" pitch double lead over the entire 18". Similarly, the radial grooves are 3/32". Furthermore, the various longitudinally extending channels 70 are formed having a radius of 5/16". Further, each of the slots are formed being ¼" from the high point of the radius. The intermediate tube is approximately 16½" long and has an outer diameter such that it fits the inner diameter of the outer shell. Preferably both the outer shell and the intermediate tube are fabricated from aluminum.

As can be appreciated from a comparison of Figs. 1, 2, 6 and 7 the second tubular member 78 comprises a curved member having a first end 80 and a second end 82 as well as an inner surface 84 and an outer surface 86. As can be appreciated in the drawings the second tubular member also has a plurality of apertures 88 formed therein with these apertures extending between the inner surface 84 and the outer surface 86 of the second tubular member 78. Thus it can be appreciated that the second end of the tubular outer shell 27 of the first tubular member 25 is attached to the curved member first end 80.

It should also be appreciated that the first tubular member is of a first length and the second tubular member is of a second length with this second length being longer than the first length. For example, in the embodiment of the invention discussed herein, the second tubular member mesures 42" in length, with the first 3" being straight. Additionally, preferably the second tubular member is also formed of aluminum. Furthermore, it should also be appreciated that the diameter of the curved member apertures are greater than the diameter of the first member apertures, primarily because the curved member apertures facilitate the flow of water therethrough while the first member apertures are used to facilitate the pulling of a vacuum.

Figure 6:
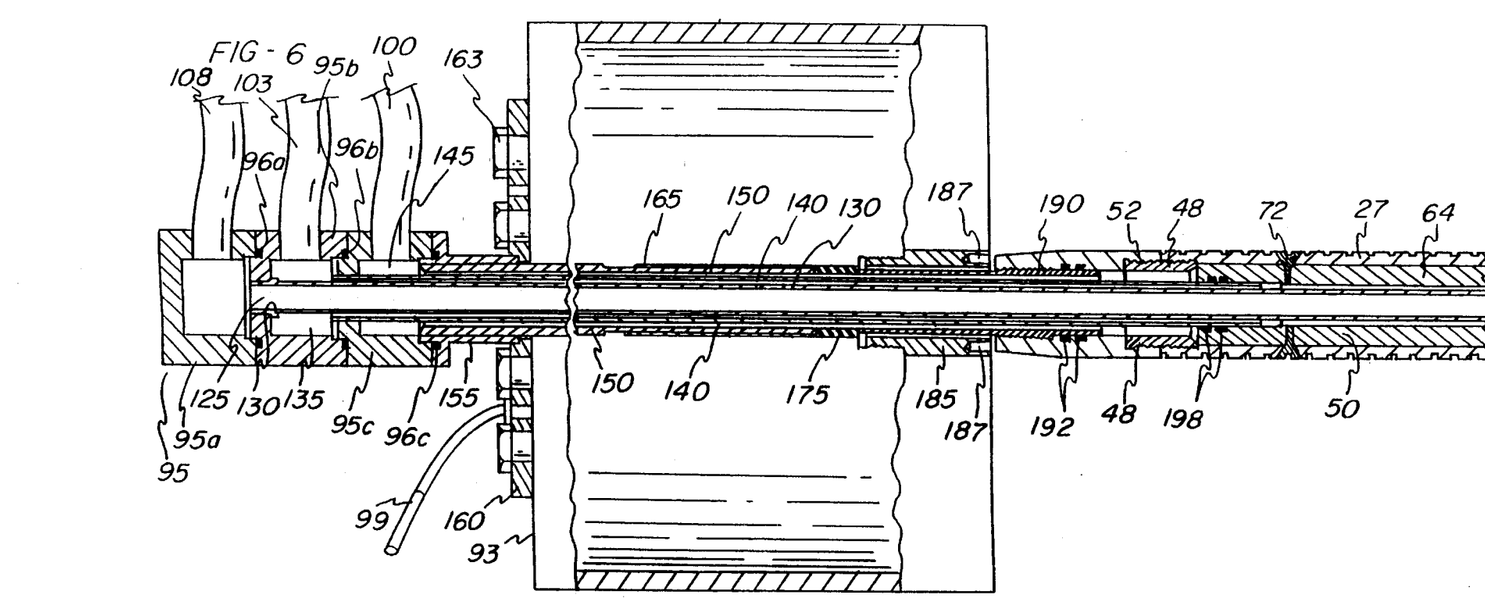
FIG. 6 is a vertical cross-sectional view on an enlarged scale of the calibration finger taken along line 6—6 of FIG. 2.
Figure 7:
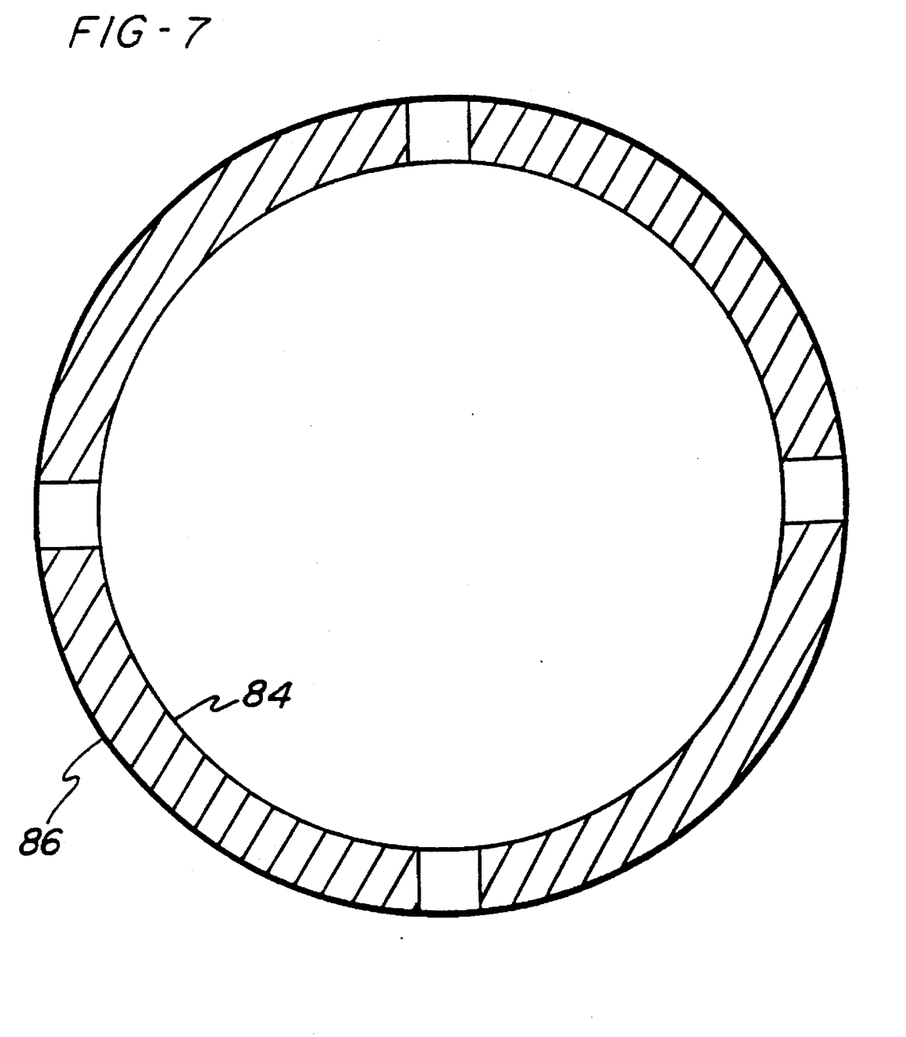
FIG. 7 is a vertical cross-sectional view on a greatly enlarged scale taken along line 7—7 of FIG. 1.

In actual assembly, the first tubular member is slid over the die manifold assembly 12. The first finger threads 90 are then secured to the threaded terminal corresponding terminal end of the die manifold assembly 12. Helping to maintain a good seal are a first pair of O-rings 92 placed within appropriate grooves on the first finger end inner surface 52 as shown in FIG. 6. The first tubular member then is positioned as shown in the middle of die head 17. The second tubular member at its first end 80 has a quick release female mechanism 94 of the type well known in pipe art. In the preferred embodiment of the machine associated with the process of this invention this quick release mechanism is a 1" brass, straight through flow valve manufactured by Parker-Hanifin, which mechanism joins with the quick release male mechanism 95 positioned at the second end 66 of the intermediate tube 64. Thus, when used in combination to form three circular apertures through a pipe wall when viewed in cross-section, the flat sections 60 on each of the calibration fingers are parallel to a flat section on an adjacent calibration finger. A second pair of 0-rings 98 are found in appropriate grooves on the inner surface 68.

In actual use, cooling water passes through the longitudinally extending channels within the manifold calibration finger while a vacuum is pulled through the radially extending channels. Still further, water flows through the apertures in the second tubular member onto the outer surface of such calibration finger.

It will be readily apparent from the foregoing detailed description of the illustrative embodiment of the invention that a particularly novel and extremely unique manifold calibration finger is provided. While the form of apparatus described herein constitutes the preferred embodiment of the invention, it is to be understood that the invention is not limited to this precise form of apparatus and that changes may be made therein without departing from the scope of the invention which is defined in the depended claims.

What is claimed is:

1. An improved manifold calibration finger for use with a die head in the extrusion of a plastic, said manifold calibration finger comprising a first member having a first and second end, said first tubular member comprising a tubular outer shell having a first and second end, said outer shell having an outer surface with a first radial groove formed therein, said first radial groove having a plurality of apertures formed therein, and said first tubular member comprising an intermediate tube having a first and second end and an inner and outer surface, said intermediate tube having formed therethrough generally longitudinally extending channels for the passage of water in a first direction, said first tubular member also having a plurality of radially extending channels extending from said apertures to said inner surface for the passage of air therethrough, said tubular outer shell encircling said intermediate tube, and a second tubular member comprising a curved member having a first end and a second end and inner and outer surface with a plurality of apertures extending from said curved member outer surface to said curved member inner surface, said second tubular member connected to said first member.

2. The calibration finger according to claim 1 wherein said first tubular member second end is attached to said curved member first end.

3. The calibration finger according to claim 1 wherein said first tubular member is of a first length and said second tubular member is of a second length, said second length being longer than said first length.

4. The calibration finger according to claim 1 wherein said outer shell outer surface has two flat sections and two curved sections.

5. The calibration finger according to claim 1 wherein a portion of intermediate tube outer surface is directly adjacent said outer shell inner surface.

6. The calibration finger according to claim 1 wherein said outer shell is comprised of a first finger end and a finger shell secured to one another by a threaded connecting ring.

7. The calibration finger according to claim 6 wherein said outer shell is also comprised of a second finger end.

8. The calibration finger according to claim 1 wherein said outer shell outer surface has a second radial groove formed therein, said second radial groove having a plurality of apertures formed therein, said first tubular member also having a plurality of channels extending from said second radial groove apertures to said inner surface.

9. The calibration finger according to claim 1 wherein said intermediate tube of said first tubular member is attached to said curved member first end.

10. The calibration finger according to claim 1 wherein the curved member apertures have a diameter greater than that of the first tubular member apertures.

11. The calibration finger according to claim 1 wherein said outer shell outer surface has a spiral groove formed therein, said spiral groove intersecting with said first radial groove.

12. The calibration finger according to claim 8 wherein said outer shell outer surface has a spiral groove formed therein, said spiral groove intersecting both said first radial groove and said second radial groove.

13. In combination, a plurality of improved manifold calibration finger for use with a die head in the extrusion of a plastic, each of said manifold calibration fingers comprising, a first tubular member having a first and second end, said first tubular member comprising a tubular outer shell having a first and second end, said outer shell having an outer surface with a first radial groove formed therein, said first radial groove having a plurality of apertures formed therein, and said first tubular member comprising an intermediate tube having a first and second end and an inner and outer surface, said intermediate tube having formed therethrough generally longitudinally extending channels for the passage of water in a first direction, said first tubular member also having a plurality of radially extending channels extending from said apertures to said inner surface for the passage of air therethrough, said tubular outer shell encircling said intermediate tube, and a second tubular member comprising a curved member having a first end and second end and inner and outer surface with a plurality of apertures extending from said curved member outer surface to said curved member inner surface, said second tubular member connected to said first tubular member, each of said outer shell outer surfaces having two flat sections and two curved sections, each of said calibration fingers adjacent at least one other calibration finger such that a flat section on one calibration finger is parallel to a flat section on an adjacent calibration finger.

14. The combination according to claim 13 wherein each said outer shell outer surface has a spiral groove formed therein, said spiral groove intersecting with said first radial groove.

15. The combination according to claim 13 wherein each said outer shell outer surface has a second radial groove formed therein, each of said second radial grooves having a plurality of apertures formed therein, each of said first tubular members having a plurality of channels extending from a second radial groove to the respective said inner surface.

* * * * *